United States Patent
Tamazaki et al.

(10) Patent No.: US 9,692,076 B2
(45) Date of Patent: Jun. 27, 2017

(54) ELECTROLYTE COMPOSITION FOR SOLID OXIDE FUEL CELL, AND SOLID OXIDE FUEL CELL

(71) Applicants: DAIICHI KIGENSO KAGAKU KOGYO CO., LTD., Osaka-shi, Osaka (JP); INSTITUTE OF NATIONAL COLLEGES OF TECHNOLOGY, JAPAN, Hachiouji-shi (JP)

(72) Inventors: Fuminori Tamazaki, Osaka (JP); Susumu Nakayama, Niihama (JP); Yasushi Nakajima, Osaka (JP)

(73) Assignees: DAIICHI KIGENSO KAGAKU KOGYO CO., LTD., Osaka-shi (JP); INSTITUTE OF NATIONAL COLLEGES OF TECHNOLOGY, JAPAN, Hachiouji-shi (JP)

( * ) Notice: Subject to any disclaimer, the term of this patent is extended or adjusted under 35 U.S.C. 154(b) by 388 days.

(21) Appl. No.: 14/201,383

(22) Filed: Mar. 7, 2014

(65) Prior Publication Data

US 2015/0255819 A1    Sep. 10, 2015

(51) Int. Cl.
*H01M 8/02* (2016.01)
*H01M 8/1253* (2016.01)
*H01M 8/124* (2016.01)

(52) U.S. Cl.
CPC .. *H01M 8/1253* (2013.01); *H01M 2008/1293* (2013.01); *H01M 2300/0077* (2013.01); *Y02E 60/525* (2013.01); *Y02P 70/56* (2015.11)

(58) Field of Classification Search
CPC ....................................................... H01M 8/02
See application file for complete search history.

(56) References Cited

FOREIGN PATENT DOCUMENTS

| JP | 1997-263603 | * | 3/1997 |
| JP | 2011-79723 A | | 4/2011 |

OTHER PUBLICATIONS

Omar et al., "Electrical Conductivity of 10 mol% Sc2O3-1 mol% M2O3-ZrO2 Ceramics", Journal of the American Ceramic Society, 2012, p. 1965-1972, J. Am. Ceram. Soc. vol. 95, No. 6, cited in the Specification.

* cited by examiner

*Primary Examiner* — Jacob Marks
(74) *Attorney, Agent, or Firm* — Westerman, Hattori, Daniels & Adrian, LLP

(57) ABSTRACT

The invention provides an electrolyte composition for solid oxide fuel cells, and a solid oxide fuel cell. The electrolyte composition has high electrical conductivity over a wide temperature range and is capable of imparting excellent output characteristics to a solid oxide fuel cell. Specifically, the invention provides a scandium oxide-stabilized zirconium oxide-based electrolyte composition used in a solid oxide fuel cell. The composition contains a compound represented by chemical formula (1): $(ZrO_2)_{1-x-a}(Sc_2O_3)_x(M_2O_3)_a$ (1), wherein $0.09 \leq x \leq 0.11$ and $0 < a \leq 0.025$, and M is at least one element selected from Sm and Nd. The compound has an electrical conductivity at 600° C. of $1.4 \times 10^{-2}$ (S/cm) or more and a power density at 600° C. of 25.0 (mW/cm$^2$) or more. The compound is not undergoing a cubic to rhombohedral phase transition at a temperature range of 25 to 850° C.

12 Claims, 1 Drawing Sheet

ELECTROLYTE COMPOSITION FOR SOLID OXIDE FUEL CELL, AND SOLID OXIDE FUEL CELL

TECHNICAL FIELD

The present invention relates to an electrolyte composition that can be used in a solid electrolyte of a solid oxide fuel cell, particularly a zirconium oxide-based electrolyte composition stabilized with scandium oxide; and also relates to a solid oxide fuel cell using the electrolyte composition.

BACKGROUND ART

Solid oxide fuel cells, called SOFCs, are known to have power generation efficiency superior to that of other types of fuel cells. Therefore, SOFCs have attracted attention due to their potential to build a new power generation system that can effectively use energy. The amount of development of SOFCs has been increasing recently.

SOFCs have a single cell structure in which a solid electrolyte has a fuel electrode on one side thereof and an air electrode on the other side. Yttria-stabilized zirconia $(ZrO_2)_{0.92}(Y_2O_3)_{0.08}$; hereinafter abbreviated as "8YSZ") is well known as an electrolyte material for forming a solid electrolyte. In addition, scandia-stabilized zirconia $((ZrO_2)_{0.9}Sc_2O_3)_{0.1}$; hereinafter referred to as "10ScSZ") using scandia, which is a stabilizer of zirconia, is also known as an electrolyte material for solid electrolytes. 10ScSZ is characterized in that although the mechanical properties, such as three-point flexural strength and fracture toughness, of 10ScSZ are equivalent to those of 8YSZ, the electrical conductivity of 10ScSZ is nearly 3 times higher than that of 8YSZ.

It is known that 10ScSZ, which has a cubic crystalline form in a high temperature range, undergoes a phase transition from cubic to rhombohedral phase at around 550° C. The phase transition problematically results in a rapid drop in the electrical conductivity of 10ScSZ. That is, 10ScSZ is considered to be a material whose electrical conductivity largely depends on the temperature. 10ScSZ has another problem in that the phase transition leads to a volume change, consequently facilitating the formation of fine cracks in the sintered body of 10ScSZ. To stabilize the crystalline state of 10ScSZ, for example, it is reportedly effective to dissolve elements, such as Ce, In, and Ga, in 10ScSZ to form a solid solution (for example, see NPL 1). The addition of such elements to 10ScSZ stabilizes the crystalline state of 10ScSZ, reducing the temperature dependence of electrical conductivity. In particular, $Zr_{0.89}Sc_{0.10}Ce_{0.01}O_\alpha$, which is obtained by dissolving Ce in scandia-stabilized zirconia, has already been commercialized.

CITATION LIST

Non-Patent Literature

NPL 1: J. Am. Ceram. Soc., 95[6], 1965-1972 (2012)

SUMMARY OF INVENTION

Technical Problem

As described above, scandia-stabilized zirconia, to which Ce and other elements are added, has a stable crystal structure, and rapid changes in its electrical conductivity are suppressed in a certain temperature range. However, even with such scandia-stabilized zirconia, it is difficult to impart high output characteristics to solid oxide fuel cells. There was still room for further improvement of output characteristics. In particular, construction of a power generation system with higher energy efficiency has been desired in recent years; however, it is the reality that solid electrolytes that meet such high requirements have not yet been developed.

The present invention has been made in view of the above circumstances. An object of the present invention is to provide an electrolyte composition for solid oxide fuel cells, and a solid oxide fuel cell, the electrolyte composition having high electrical conductivity over a wide temperature range and being capable of imparting excellent output characteristics to a solid oxide fuel cell.

Solution to Problem

In order to achieve the above object, the present inventors conducted extensive research, and found that scandia-stabilized zirconia containing at least one element selected from Nd and Sm is capable of achieving the above object. The present invention has been accomplished based on this finding.

More specifically, as described below, the invention relates to an electrolyte composition for solid oxide fuel cells, and to a solid oxide fuel cell.

1. A scandium oxide-stabilized zirconium oxide-based electrolyte composition used in a solid oxide fuel cell, the composition comprising a compound represented by chemical formula (1) below:

$$(ZrO_2)_{1-x-a}(Sc_2O_3)_x(M_2O_3)_a \qquad (1),$$

wherein $0.09 \leq x \leq 0.11$ and $0 < a \leq 0.025$, and M is at least one element selected from Sm and Nd, the compound having an electrical conductivity at 600° C. of $1.4 \times 10^{-2}$ (S/cm) or more and a power density at 600° C. of 25.0 (mW/cm²) or more, the compound not undergoing a cubic to rhombohedral phase transition at a temperature range of 25 to 850° C.

2. The electrolyte composition according to Item 1, wherein the compound has an electrical conductivity at 550° C. of $8.5 \times 10^{-3}$ (S/cm) or more and a power density at 550° C. of 10.0 (mW/cm²) or more.

3. The electrolyte composition according to Item 1, wherein the compound has an electrical conductivity at 500° C. of $3.0 \times 10^{-3}$ (S/cm) or more and a power density at 500° C. of 4.0 (mW/cm²) or more.

4. A scandium oxide-stabilized zirconium oxide-based electrolyte composition used in a solid oxide fuel cell, the composition comprising a compound represented by chemical formula (1) below:

$$(ZrO_2)_{1-x-a}(Sc_2O_3)_x(M_2O_3)_a \qquad (1),$$

wherein $0.09 \leq x \leq 0.11$ and $0 < a \leq 0.015$, and M is at least one element selected from Sm and Nd, the compound having an electrical conductivity at 600° C. of $1.4 \times 10^{-2}$ (S/cm) or more and a power density at 600° C. of 25.0 (mW/cm²) or more, the compound not undergoing a cubic to rhombohedral phase transition at a temperature range of 25 to 850° C.

5. The electrolyte composition according to Item 4, wherein the compound has an electrical conductivity at 550° C. of $8.5 \times 10^{-3}$ (S/cm) or more and a power density at 550° C. of 10.0 (mW/cm²) or more.

6. The composition according to item 4, wherein the compound has an electrical conductivity at 500° C. of $3.0 \times 10^{-3}$ (S/cm) or more and a power density at 500° C. of 4.0 (mW/cm$^2$) or more.

7. A solid oxide fuel cell having a single cell structure including a solid electrolyte comprising the electrolyte composition of any one of Items 1 to 6, the solid electrolyte having a fuel electrode on one surface and an air electrode on the opposite surface.

Advantageous Effects of Invention

The electrolyte composition for solid oxide fuel cells of the invention does not undergo a cubic to rhombohedral phase transition. The electrolyte composition of the invention thus has high electrical conductivity over a wide temperature range, and is capable of imparting high power density to a solid oxide fuel cell. Therefore, a solid oxide fuel cell comprising this electrolyte composition can achieve high power generation efficiency, making construction of an excellent power generation system possible.

DESCRIPTION OF EMBODIMENTS

Figure 1:
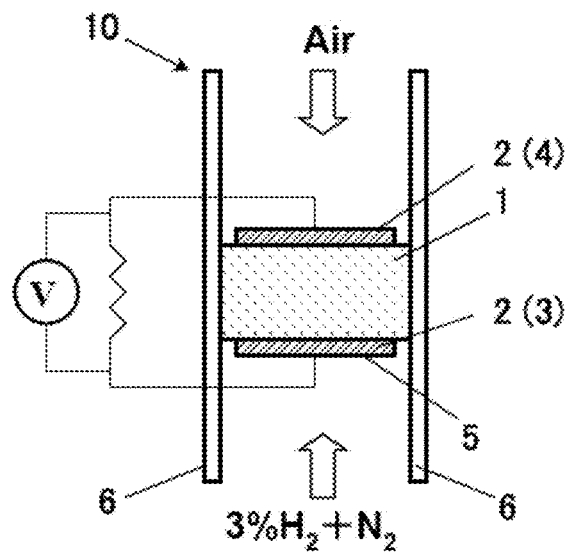
FIG. 1 is a schematic view of a measurement device for evaluating the power generation characteristics of SOFCs.

The embodiments of the invention are described in detail below.

The electrolyte composition of the invention contains a scandium oxide-stabilized zirconium oxide-based compound (hereafter abbreviated as "compound A") represented by chemical formula (1) below:

$$(ZrO_2)_{1-x-a}(Sc_2O_3)_x(M_2O_3)_a \quad (1),$$

In formula (1) above, $0.09 \leq x \leq 0.11$ and $0 < a \leq 0.025$, and M is at least one element selected from Sm and Nd. Compound A has an electrical conductivity at 600° C. of $1.4 \times 10^{-2}$ (S/cm) or more and a power density at 600° C. of 25.0 (mW/cm$^2$) or more. The upper limit of the electrical conductivity at 600° C. of compound A is not particularly limited, and may be, for example, $3.5 \times 10^{-2}$ (S/cm). The upper limit of the power density at 600° C. of compound A is not particularly limited, and may be, for example, 50.0 (mW/cm$^2$).

In this specification, the power density of compound A refers to a measured power density value of a solid oxide fuel cell containing a solid electrolyte formed from an electrolyte composition. The details of the measurement device and measurement method are described in Examples below.

Compound A has a property such that it does not undergo a cubic to rhombohedral phase transition at a temperature range of 25 to 850° C. If compound A undergoes phase transition from cubic to rhombohedral phase at a temperature range of 25 to 850° C., the electrical conductivity will greatly decrease. As long as the cubic phase is maintained at a temperature range of 25 to 850° C., compound A has high electrical conductivity over this temperature range, achieving low temperature dependence of the electrical conductivity.

Whether compound A has undergone a cubic to rhombohedral phase transition can be determined from X-ray diffraction peaks in X-ray diffraction measurements. Specifically, the surface of a sintered body of compound A is subjected to X-ray diffraction measurement, and when each X-ray diffraction peak splits into two peaks at around 2θ=28° to 32°, 49° to 52°, and 59° to 62°, the phase is considered to be rhombohedral; and when each peak does not split, the phase is considered to be cubic. The rhombohedral phase can also be referred to as the trigonal phase.

The electrolyte composition containing compound A above can be used as an electrolyte material for forming a solid electrolyte to be incorporated into a solid oxide fuel cell (SOFC). In particular, compound A has both high electrical conductivity and high power density, and can thus impart excellent output characteristics to a solid oxide fuel cell. Therefore, the provision of a solid oxide fuel cell having excellent power generation efficiency is possible.

In formula (1) above, if x is outside the range of $0.09 \leq x \leq 0.11$, the electrical conductivity and power density of compound A will not be as high as the above, and excellent output characteristics cannot be imparted to a solid oxide fuel cell. Likewise, if a is outside the range of $0 < a \leq 0.025$, the electrical conductivity and power density of compound A will not be as high as the above, and excellent output characteristics cannot be imparted to a solid oxide fuel cell. In formula (1) above, a is preferably in the range of $0 < a \leq 0.015$. In this range, compound A has higher electrical conductivity and higher power density.

In formula (1) above, if M is an element other than Sm and Nd, compound A will be more likely to undergo phase transition from cubic to rhombohedral phase at 25 to 350° C., and the temperature dependence of electrical conductivity will increase. Further, if M is an element other than Sm and Nd, even if compound A does not undergo phase transition as above, achieving a desired electrical conductivity and power density will become difficult. In compound A, M in formula (1) is at least one element selected from Sm and Nd. It is also possible that M is both Sm and Nd. In this case, compound A is a mixture of a compound in which M is Sm, and a compound in which M is Nd.

It is preferable that compound A has an electrical conductivity at 550° C. of $8.5 \times 10$ (S/cm) or more and a power density at 550° C. of 10.0 (mW/cm$^2$) or more. In this case, a solid electrolyte formed from an electrolyte composition containing this compound A can impart further improved power generation efficiency to a solid oxide fuel cell.

It is also preferable that compound A has an electrical conductivity at 500° C. of $3.0 \times 10^{-3}$ (S/cm) or more and a power density at 500° C. of 4.0 (mW/cm$^2$) or more. In this case as well, high power generation efficiency can be imparted to a solid oxide fuel cell.

Compound A can be produced by various known methods, such as a coprecipitation method, a solid-phase reaction method, and a sol-gel method. In particular, a coprecipitation method can more uniformly produce compound A with a more stable crystalline structure. As a result, higher power density can be imparted to a solid oxide fuel cell. From this viewpoint, compound A is preferably produced by a coprecipitation method.

In one embodiment, compound A may be produced by a coprecipitation method according to, for example, the following procedures. First, a required amount of M$_2$O$_3$ (M is at least one element selected from Sm and Nd) is dissolved in a nitrate solution containing Sc$_2$O$_3$ in a dissolved state, and the resulting solution is mixed with an aqueous ZrOCl$_2$ solution to prepare a mixed aqueous solution. Ammonia water or the like is added to this mixed aqueous solution as a coprecipitation agent to obtain a precipitate mixture containing an $M_2O_3$ hydroxide and a mixed hydroxide of a Zr hydroxide and an Sc hydroxide. Subsequently, the obtained precipitate mixture is washed, and then subjected to solid-liquid separation by filtration. The separated solid is calcined at a temperature of 600 to 1000° C. over about 5 to 12 hours. Finally, the calcined solid is crushed to thereby synthesize compound A, which is a scandia-stabilized zirconia powder mixture containing $M_2O_3$.

The coprecipitation method described above is merely one example, and the operational procedures, the medicinal agent such as a coprecipitation agent, and the like, may be appropriately changed. For example, a basic zirconium sulfate may be used as a starting material, and a predetermined amount of a variety of salt solutions may be added thereto for neutralization.

In one embodiment, compound A may be produced by a solid-phase reaction method, for example, as below. Scandia-stabilized zirconia (e.g., $(ZrO_2)_{0.90}(Sc_2O_3)_{0.10}$) and $Nd_2O_3$ are prepared as starting materials. These starting materials in predetermined amounts are mixed, followed by kneading in the presence of pure water in a ball-mill or the like. Thereafter, the moisture is dried, followed by calcination at a predetermined temperature. A binder such as an acrylic resin is added to the thus-obtained calcined product, followed by wet-crushing. After the moisture is dried, sintering is performed to produce compound A.

Compound A produced in the above manner contains, as a main component, scandia-stabilized zirconia in the form of a solid solution (hereafter abbreviated as "ScSZ") in which scandia ($Sc_2O_3$) is dissolved in zirconia ($ZrO_2$). In this ScSZ, $M_7O_3$ ($Sm_2O_3$ or $Nd_2O_3$) is present in a state of solid solution. Due to the presence of this $M_2O_3$, compound A has a stable crystalline phase (cubic phase).

In addition to compound A above, the electrolyte composition may contain other solid electrolytes, additives, and the like, as long as they do not hinder the effects of the invention. It is also possible that the electrolyte composition consists only of compound A.

The electrolyte composition may be formed into a plate-shaped solid electrolyte by a pressure-forming method using a isostatic pressing machine, a doctor blade method, or a calendar roll method. This plate-shaped solid electrolyte is used as a solid electrolyte plate of SOFC. The conditions for forming the electrolyte composition into a solid electrolyte plate are not particularly limited, and known conditions may be employed.

By forming a fuel electrode on one surface of this solid electrolyte plate and an air electrode on the opposite surface thereof, a solid oxide fuel cell having a single cell structure, in which the solid electrolyte has a fuel electrode on one surface and an air electrode on the opposite surface, can be obtained.

To form a fuel electrode on one surface of a solid electrolyte plate, a slurry containing a ceramic powder for forming a fuel electrode is used. This slurry is applied to one surface of a solid electrolyte plate by a so-called slurry coating method, followed by calcination at a predetermined temperature. In this manner, a solid electrolyte plate having a thin fuel electrode film on its one surface is obtained. The ceramic powder for forming a fuel electrode may be, for example, a nickel-zirconia cermet material comprising nickel (40 wt %) and zirconia (60 wt %). It is also possible to use a known ceramic powder that has been used to form a fuel electrode. The thickness of the fuel electrode may be, for example, 50 μm, but is not limited to this thickness.

As with the case of the fuel electrode, to form an air electrode on a solid electrolyte plate, a slurry containing a ceramic powder for forming an air electrode is applied to one surface of a solid electrolyte plate by a slurry coating method, followed by calcination at a predetermined temperature. In this manner, it is possible to obtain a solid electrolyte plate having a thin air electrode film on the surface opposite to the surface on which a fuel electrode is formed. The ceramic powder for forming an air electrode may be, for example, lanthanum strontium manganite (La(Sr)MnO$_3$), or the like. It is also possible to use a known ceramic powder that has been used to form an air electrode. The thickness of the air electrode may be, for example, 50 μm, but is not limited to this thickness.

A solid oxide fuel cell having the above structure comprises the solid electrolyte plate formed using the electrolyte composition of the invention, and thus has high power density and excellent power generation efficiency. Therefore, this solid oxide fuel cell enables the construction of a power generation system that achieves excellent energy efficiency.

EXAMPLES

The present invention is described in detail below with reference to Examples; however, the present invention is not limited to the embodiments of these Examples.

The materials obtained in the Examples and Comparative Examples each contain 1.3 to 2.5 wt. % of hafnium oxide as an inevitable impurity based on the amount of zirconium oxide.

Example 1

First, basic zirconium sulfate (87.6 g in terms of zirconium oxide) was dispersed in 1,000 g of water. A collected scandium salt solution was added to the resulting dispersion so that the concentration was 10 mol % (11.0 g in terms of scandium oxide) of the amount of basic zirconium sulfate in terms of zirconium oxide. Further, a neodymium chloride solution was added to the resulting dispersion so that the concentration was 0.5 mol % (1.4 g in terms of neodymium oxide) of the amount of basic zirconium sulfate in terms of zirconium oxide, thereby preparing a mixture. Then, a 25 wt. % aqueous sodium hydroxide solution was added until the pH of the mixture reached 13.5, and a precipitate was thus obtained. The produced precipitate was subjected to solid-liquid separation and collected. The obtained solid was calcined in air at 1,000° C. for 5 hours to thereby obtain an electrolyte composition. The electrolyte composition is a compound represented by the chemical formula: $(ZrO_2)_{1-x-a}(Sc_2O_3)_x(Nd_2O_3)_a$, wherein x=0.10 and a=0.005.

Subsequently, the electrolyte composition was molded into a disk shape using a uniaxial die-press at a molding pressure of 100 MPa. The thus-obtained molded product was sintered in air at 1,450° C. on a zirconia setter for 3 hours, thereby obtaining a sintered body.

Example 2

A sintered body was obtained by preparing an electrolyte composition in the same manner as in Example 1, except that the neodymium chloride solution was changed to a samarium chloride solution. The compound constituting the electrolyte composition produced in this Example is represented by the chemical formula: $(ZrO_2)_{1-x-a}(Sc_2O_3)_x(Sm_2O_3)_a$, wherein $x=0.10$ and $a=0.005$.

Comparative Example 1

A sintered body was obtained by preparing an electrolyte composition in the same manner as in Example 1, except that the neodymium chloride solution was changed to a cerium chloride solution. The compound constituting the electrolyte composition produced in this Comparative Example is represented by the chemical formula: $(ZrO_2)_{1-x-a}(Sc_2O_3)_x(CeO_2)_a$, wherein $x=0.10$ and $a=0.01$.

Comparative Example 2

An electrolyte composition comprising only scandia-stabilized zirconia $(ZrO_2)_{0.90}(Sc_2O_3)_{0.10}$ (produced by Daiichi Kigenso Kagaku Kogyo Co., Ltd.; hereinafter abbreviated as "10ScSZ") was prepared, and a sintered body was obtained from this electrolyte composition in the same manner as in Example 1.

Evaluation Method

The sintered bodies obtained in the Examples and Comparative Examples were subjected to the determination of the crystalline state of the sintered bodies, the determination of the presence of a phase transition from cubic to rhombohedral phase in the sintered bodies, and the measurement of the electrical conductivity of the sintered bodies. Further, SOFC power generation characteristics were evaluated when the sintered bodies were used as solid electrolytes. Each evaluation method is described below.

Determination of Crystalline State of Sintered Body

The presence of crystals of either the cubic phase or the rhombohedral phase in the sintered bodies was determined by the spectra of X-ray diffraction (XRD) measurements. The X-ray diffraction measurements were performed using a "MiniFlex II" (produced by Rigaku Corporation) by Cu K$\alpha$1 ray in the range of $2\theta=20°$ to $80°$ at room temperature. More specifically, of X-ray diffraction peaks observed by the X-ray diffraction measurements of the surface of the sintered bodies, when X-ray diffraction peaks at around $2\theta=28°$ to $32°$, $49°$ to $52°$, and $59°$ to $62°$ were each split into two peaks, the phase was considered to be rhombohedral; and when the peaks were not split, the phase was considered to be cubic.

Determination of Presence of Phase Transition in Sintered Body

The presence of a phase transition from cubic to rhombohedral phase in each sintered body at around 550° C. was determined by electrical conductivity measurements. The electrical conductivity measurements were performed in the following manner. Pt paste ("PT Silvest No. 8105," produced by Tokuriki Chemical Research Co., Ltd.) was applied to both sides of the sintered body. After a Pt wire was attached, baking treatment was carried out at 1,000° C., thereby producing a Pt electrode for measuring electrical conductivity. The sintered body used here has a diameter ($\phi$) of 12 mm and a thickness (t) of 3 mm. The Pt electrode has a diameter ($\phi$) of 6 mm and a sample thickness of 3 mm. The electrical conductivity was measured using an impedance meter (HP4194A) in a frequency range of 100 Hz to 10 MHz, and the relationship between the electrical conductivity and the temperature was plotted (Arrhenius plot) by complex impedance analysis in the temperature range of 300° C. to 800° C. The electrical conductivity of the sintered body was measured in the temperature range of 300° C. to 800° C. When an Arrhenius plot showing an almost linear conductivity change in the entire temperature range was obtained, there was considered to be no phase change; and when a conductivity change aside from the linear conductivity change was observed at around 550° C., there was considered to be a phase change.

Electrical Conductivity Measurement

Electrical conductivity measurements were performed in the same manner as the above electrical conductivity measurements for the determination of the presence of a phase transition in the sintered bodies.

SOFC Power Generation Characteristics

SOFC power generation characteristics were evaluated by a measurement device 10 shown in FIG. 1. The measurement device 10 comprises a single cell 5 accommodated in a quartz glass pipe 6, and an external voltage can be applied to the single cell 5. The single cell 5 comprises a sintered body 1 ($\phi$: 25 mm, thickness: 1 mm) and Pt electrodes 2 ($\phi$: 8 mm) each attached to both sides of the sintered body 1. One of the Pt electrodes 2 serves as a fuel electrode 3, and the other serves as an air electrode 4. The Pt electrodes 2 can be provided in both sides of the sintered body 1 by an ion coater. The test SOFC device 10 was used to measure the voltage and power density in the range of 450 to 600° C. The relationship between the current and voltage at each temperature, and the relationship between the current and power density were each plotted to evaluate the SOFC power generation characteristics. During the measurement, 3%-$H_2$ gas (nitrogen balance) was supplied to the fuel electrode 3 side at a flow rate of 800 mL·$min^{-1}$, and air was supplied to the air electrode 4 side at a flow rate of 300 mL·$min^{-1}$.

Figure 2:
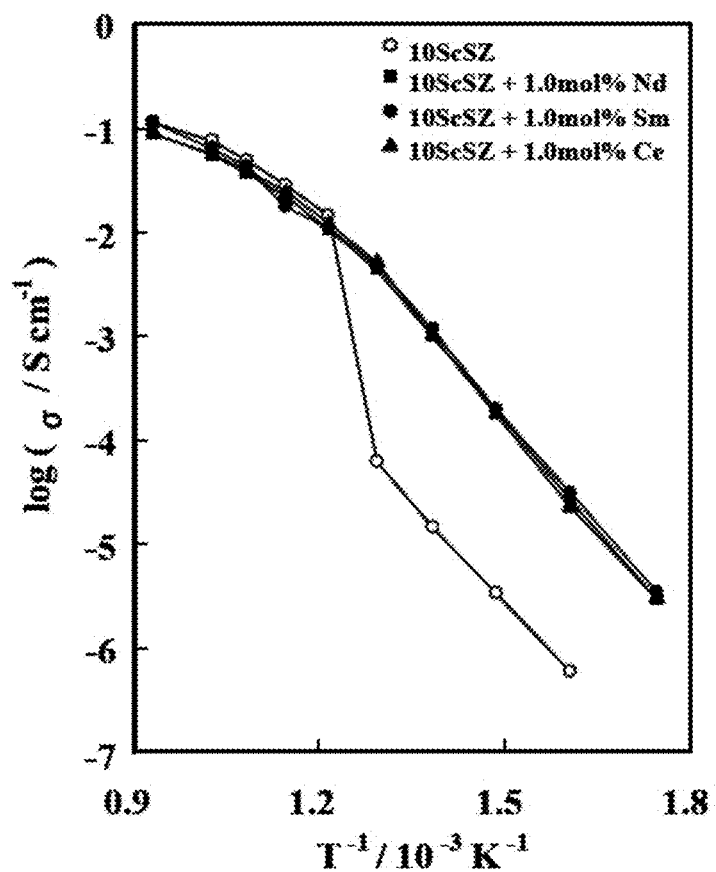
FIG. 2 is an Arrhenius plot showing the relationship between the temperature and the electrical conductivity of sintered bodies obtained in the Examples and Comparative Examples.

FIG. 2 shows the relationship (Arrhenius plot) between the electrical conductivity (vertical axis) of the sintered bodies of the Examples and Comparative Examples, and the temperature inverse (horizontal axis).

Further, Table 1 shows the presence of a phase transition in the sintered bodies of the Examples and Comparative Examples, the electrical conductivity at 600° C., 550° C., and 500° C., and the maximum power density at 600° C., 550° C., and 500° C. of SOFCs produced from the sintered bodies of the Examples and Comparative Examples.

The XRD measurements revealed that the sintered bodies of Examples 1 and 2, and Comparative Example 1 had only a cubic phase, while the sintered body of Comparative Example 2 had both cubic and rhombohedral phases. Moreover, as is clear from the Arrhenius plot in FIG. 2, the sintered bodies of Example 1 (10ScSZ+1.0 mol % Nd), Example 2 (10ScSZ+1.0 mol % Sm), and Comparative Example 1 (10ScSZ+1.0 mol % Ce) showed almost linear conductivity changes in the entire temperature range. This suggests that no phase change from cubic to rhombohedral occurred. On the other hand, the sintered body of Comparative Example 2 (10ScSZ) showed a rapid decrease in its electrical conductivity at around 550° C. This is caused by a phase change from cubic to rhombohedral occurring at around 550° C.

Furthermore, as is clear from Table 1, the electrical conductivities of the sintered bodies of Examples 1 and 2, and Comparative Example 1 at 600° C., 550° C., and 500° C. were almost equivalent. In contrast, a comparison of the maximum power densities at 600° C. indicates that the maximum power output densities of the SOFCs produced from the sintered bodies of Examples 1 and 2 are greater than that of the SOFC produced from the sintered body of Comparative Example 1. This suggests that the solid electrolyte comprising 10ScSZ stabilized with Nd or Sm can impart more excellent power generation characteristics than the solid electrolyte comprising 10ScSZ stabilized with Ce.

The electrical conductivity and maximum power density of the 10ScSZ of Comparative Example 2 at 600° C. are greater than those of Examples 1 and 2. However, as described above, the 10ScSZ of Comparative Example 2 undergoes a phase transition from cubic to rhombohedral phase, which causes the problem of fine cracks in the sintered body due to the volume change caused by the phase transition.

TABLE 1

| Ex./Comp. Ex. | Sample | Presence of phase transition | 600° C. Electrical conductivity (S · cm$^{-1}$) | 600° C. Max. power density (mW · cm$^{-2}$) | 550° C. Electrical conductivity (S · cm$^{-1}$) | 550° C. Max. power density (mW · cm$^{-2}$) | 500° C. Electrical conductivity (S · cm$^{-1}$) | 500° C. Max. power density (mW · cm$^{-2}$) |
|---|---|---|---|---|---|---|---|---|
| Ex. 1 | 10ScSZ + 1.0 mol % Nd | No | $2.1 \times 10^{-2}$ | 27.3 | $1.2 \times 10^{-2}$ | 14.4 | $4.2 \times 10^{-3}$ | 5.4 |
| Ex. 2 | 10ScSZ + 1.0 mol % Sm | No | $2.2 \times 10^{-2}$ | 29.8 | $1.3 \times 10^{-2}$ | 11.0 | $5.0 \times 10^{-3}$ | 4.3 |
| Comp. Ex. 1 | 10ScSZ + 1.0 mol % Ce | No | $2.4 \times 10^{-2}$ | 22.1 | $1.3 \times 10^{-2}$ | 13.2 | $5.3 \times 10^{-3}$ | 5.3 |
| Comp. Ex. 2 | 10ScSZ | Yes | $3.3 \times 10^{-2}$ | 31.1 | $1.5 \times 10^{-2}$ | 13.8 | $0.1 \times 10^{-3}$ | 0.2 |

The electrolyte composition of the invention has high electrical conductivity over a wide temperature range, and can impart high power density to a solid oxide fuel cell. Therefore, the electrolyte composition of the invention is useful as an electrolyte material for a solid electrolyte used in a solid oxide fuel cell. A solid oxide fuel cell produced by using the electrolyte composition of the invention has high power density and excellent power generation efficiency, and is thus useful for constructing a power generation system that achieves excellent energy efficiency.

REFERENCE SIGNS LIST

1. Sintered body
2. Pt electrode
3. Fuel electrode
4. Air electrode
5. Single cell
6. Quartz glass pipe
10. Measurement device

The invention claimed is:

1. A scandium oxide-stabilized zirconium oxide-based electrolyte composition used in a solid oxide fuel cell,
   the composition comprising a compound represented by chemical formula (1) below:

$$(ZrO_2)1-x-a(Sc_2O_3)x(M_2O_3)a \quad (1),$$

wherein $0.09 \leq x \leq 0.11$ and $0 < a \leq 0.025$, and M is at least one element selected from Sm and Nd,
   the $M_2O_3$ being present in a state of solid solution in the scandium oxide-stabilized zirconium, the compound is produced by a coprecipitation method, a solid-phase reaction method, or a sol-gel method,
   the compound having an electrical conductivity at 600° C. of $1.4 \times 10$-2 (S/cm) or more and a power density at 600° C. of 25.0 (mW/cm2) or more,
   the compound not undergoing a cubic to rhombohedral phase transition at a temperature range of 25 to 850° C.

2. The electrolyte composition according to claim 1, wherein the compound has an electrical conductivity at 550° C. of $8.5 \times 10$-3 (S/cm) or more and a power density at 550° C. of 10.0 (mW/cm2) or more.

3. The electrolyte composition according to claim 1, wherein the compound has an electrical conductivity at 500° C. of $3.0 \times 10$-3 (S/cm) or more and a power density at 500° C. of 4.0 (mW/cm2) or more.

4. A scandium oxide-stabilized zirconium oxide-based electrolyte composition used in a solid oxide fuel cell,
   the composition comprising a compound represented by chemical formula (1) below:

$$(ZrO_2)1-x-a(Sc_2O_3)x(M_2O_3)a \quad (1),$$

wherein $0.09 \leq x \leq 0.11$ and $0 < a \leq 0.015$, and M is at least one element selected from Sm and Nd,
   the $M_2O_3$ being present in a state of solid solution in the scandium oxide-stabilized zirconium, the compound is produced by a coprecipitation method, a solid-phase reaction method, or a sol-gel method,
   the compound having an electrical conductivity at 600° C. of $1.4 \times 10$-2 (S/cm) or more and a power density at 600° C. of 25.0 (mW/cm2) or more,
   the compound not undergoing a cubic to rhombohedral phase transition at a temperature range of 25 to 850° C.

5. The electrolyte composition according to claim 4, wherein the compound has an electrical conductivity at 550° C. of $8.5 \times 10$-3 (S/cm) or more and a power density at 550° C. of 10.0 (mW/cm2) or more.

6. The composition according to claim 4, wherein the compound has an electrical conductivity at 500° C. of $3.0 \times 10^{-3}$ (S/cm) or more and a power density at 500° C. of 4.0 (mW/cm$^2$) or more.

7. A solid oxide fuel cell having a single cell structure including a solid electrolyte comprising the electrolyte composition of claim 1, the solid electrolyte having a fuel electrode on one surface and an air electrode on the opposite surface.

8. A solid oxide fuel cell having a single cell structure including a solid electrolyte comprising the electrolyte composition of claim 2, the solid electrolyte having a fuel electrode on one surface and an air electrode on the opposite surface.

9. A solid oxide fuel cell having a single cell structure including a solid electrolyte comprising the electrolyte composition of claim 3, the solid electrolyte having a fuel electrode on one surface and an air electrode on the opposite surface.

10. A solid oxide fuel cell having a single cell structure including a solid electrolyte comprising the electrolyte composition of claim 4, the solid electrolyte having a fuel electrode on one surface and an air electrode on the opposite surface.

11. A solid oxide fuel cell having a single cell structure including a solid electrolyte comprising the electrolyte composition of claim 5, the solid electrolyte having a fuel electrode on one surface and an air electrode on the opposite surface.

12. A solid oxide fuel cell having a single cell structure including a solid electrolyte comprising the electrolyte composition of claim 6, the solid electrolyte having a fuel electrode on one surface and an air electrode on the opposite surface.

\* \* \* \* \*